United States Patent [19]
Witts

[11] 4,333,085
[45] Jun. 1, 1982

[54] TIME RECORDER

[75] Inventor: Alan G. Witts, Wimborne, England

[73] Assignee: ITR International Time Limited, Dorset, England

[21] Appl. No.: 155,128

[22] Filed: May 30, 1980

[30] Foreign Application Priority Data

Jun. 1, 1979 [GB] United Kingdom ................ 7919135

[51] Int. Cl.³ .................... G01D 15/10; G07C 1/06
[52] U.S. Cl. ............................ 346/76 PH; 235/377; 235/419; 346/83; 364/406
[58] Field of Search .................................. 346/80–86, 346/76 PH; 235/419, 377; 364/401, 406

[56] References Cited

U.S. PATENT DOCUMENTS

| 4,011,434 | 3/1977 | Hockler | 346/82 X |
| 4,017,857 | 4/1977 | Evans | 346/82 X |
| 4,170,015 | 10/1979 | Elliano | 346/82 X |
| 4,270,043 | 5/1981 | Baxter | 235/419 |

Primary Examiner—Joseph W. Hartary
Attorney, Agent, or Firm—Shoemaker and Mattare, Ltd.

[57] ABSTRACT

A data recorder for use in processing cards and the like comprises a housing which has mounted therein electronic control system incorporating both firmware and software programs. A thermal printer and optical reading device are mounted in the housing for printing information onto the card and reading information on the card respectively. The data recorder may be used as a clocking-on device and special cards provided for changing at least one of the software programs of the electronic control system.

13 Claims, 13 Drawing Figures

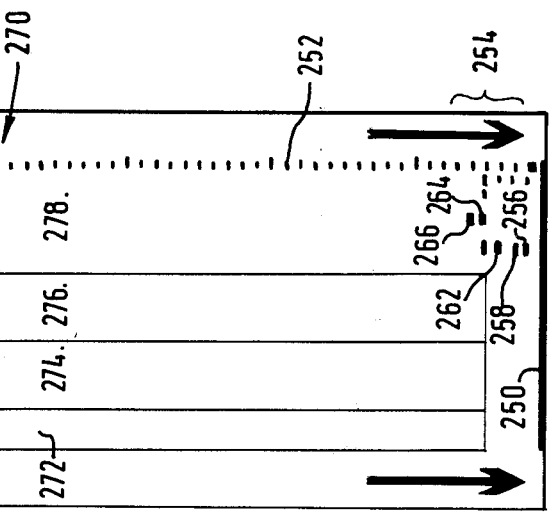

FIG. 13 DUMP CARD

FIG. 12 DATA INPUT CARD

TIME RECORDER

FIELD OF THE INVENTION

This invention relates to data recording equipment operative with devices such as cards and the like presented to such equipment usually by hand.

BACKGROUND OF THE INVENTION

One common type of data recording equipment is that for recording hours at which a person is at work and for printing such intervals on an attendance record card. Such apparatus has commonly been electromechanical in nature and relatively inflexible, which has by reason of technical limitations led to two main types of equipment being available, one type for recording hours of work attendance and another type for job costing. With the increased use of flexitime in industry the need for more flexible system has arisen, preferably with a data processing capability, which can combine the functions of work attendance and job costing.

Accordingly there is currently available a variety of computer based systems, as time recording equipment for example, which are arranged to read cards, badges and the like and to perform various data processing functions. However, the need exists for compact and relatively inexpensive stand-alone time recording equipment having in-built data processing capability.

SUMMARY OF THE INVENTION

According to the present invention there is provided a data recorder for receiving cards and the like and for processing information thereon comprising a housing including an electronic control system mounted in said housing incorporating both firmware and software programmes, a printer mounted in the housing for printing on the card, and an optical reading device mounted in the housing for reading said information.

As a preferred feature of the invention, said printer means is arranged to print on said device characters or marks which can be recognised by the optical character device. This is an important feature for the data processing capability of the recorder since the character or mark bearing device, commonly a card, may be coded by the printer to denote for example the person to whom the card is issued and this coding is stored in the electronic control system so as to be referenced whenever the card is re-inserted into the device.

The electronic control system is arranged to be programmed at least to some extent by the insertion of a card bearing an appropriate array of characters or marks. Thus for example, the system may be programmed with shift times, overtime rates etc, by this means. Later on another key card may be employed to alter data relating to semipermanent information, such as the shift times, overtime rates etc. which may be changed from time to time.

The equipment of the present invention lends itself to operation with a variety of types of cards, and commonly there may be provided for each person using the equipment a card coded with a code in the form of an array of marks, allocated to that person, and cards (termed enable or key cards) which set the equipment by setting a flag location in a memory to different values for different modes of operation of the equipment. In a typical application after the beginning of a shift in a factory, a key card may be inserted to enable the insertion of a dump card onto which will be printed by the recording equipment the times of arrival of all employees, among other information; this is a useful check for the employer. Further a key or enable card may be employed where an employee wishes to use his data record card in out of limits periods where the card would normally be rejected.

The use of an optical method of character or mark recognition is important in the context of a computerised system, since an optical method is very flexible in its method of use and has low power requirements, and requires no moving parts; this may be contrasted with, for example, a punched card method of recognition employing electromechanical sensing apparatus which has previously been used in time recording equipment.

As regard said printing means, there are four types of printer which may be used in the present invention, namely (i) a wheel bearing characters and a hammer striking the wheel; (ii) a dot matrix printer; (iii) an electrosensitive print mechanism cooperating with electrosensitive paper; and preferably (iv) thermal printing.

A data recorder according to the invention may comprise time recording equipment. Such equipment may be housed in a casing means and comprise a clock or clock input indicating time of day, means for receiving a character or mark bearing card presented by hand to the equipment, an electronic control system incorporating both firmware and software programmes, means responsive to the presentation of the card to record a time provided by said clock or clock input, a printing mechanism having a head for printing said time and/or other information on said card, means for stepping said card across the head, an optical reading device for reading information on said card, and electric circuit means arranged to receive information via said optical reading device and to alter at least one of said software programmes in response to said information to adjust said equipment performance for subsequent operation.

A card guide member having an input slot and a guideway extending through the recorder from the input slot to an output slot is preferred, the input slot being arranged on one side of a casing of the recorder and the output slot being arranged on an opposite side of the casing. This provides a very simple and convenient method of processing the card through the recorder since all that is required is a uni-directional movement of the card through the device.

One or more push buttons for manually over-riding control functions of the recorder may be provided for setting time of day etc. The display will display time of day on a time recording equipment but in the event of an internal fault, the recorder can be arranged to display various code numbers depending on the type of fault, which is useful in a fault finding diagnostic routine. A buzzer may be provided giving audible warning should faults occur. This may be activated by a watch dog circuit which at regular intervals checks the information present in storage in the recorder.

Since the recorder is normally required to be operable at only for short well-spaced intervals, whenever a card is presented to the recorder, the recorder is preferably arranged to be switched off at other times. This is advantageous since micro-processors employing NMOS technology have a relatively high power consumption. Also, where a battery back-up is provided for the event of mains failure, it is important to reduce power consumption to a minimum. A latch is provided for any display to maintain the display on, and microprocessor circuits are arranged normally to be switched to an off condition. When a card is presented to the device, a starter routine is followed in which the programme counter is set to the correct part of the programme and other registers are set to the correct values. Depending whether updating is required or card reading is required, a programme counter is set to the appropriate value for initiating a correct software routine. It will be understood that power will be maintained at all times to any volatile memory storage locations.

A communication interface may be provided which enables recorders according to the invention to be linked together. Recorders may be linked to an intelligent terminal which connects the recorders to a host computer system; this is of value where a large data processing capability is required.

BRIEF DESCRIPTION OF THE DRAWINGS

A data recorder according to the invention will now be described by way of example, with reference to the accompanying drawings, wherein:

FIG. 10 is a view of a partially used card for insertion in the time recording equipment by an employee for recording hours of work;

FIG. 11 is a view of a key card which sets the time recording equipment to a different functional mode of operation;

FIG. 12 is a view of a programme card for revising semi-permanent information contained in the computer system; and FIG. 13 is a view of a dump card onto which is printed information stored in the electronic system relating to an employee's hours of work.

Figure 1:
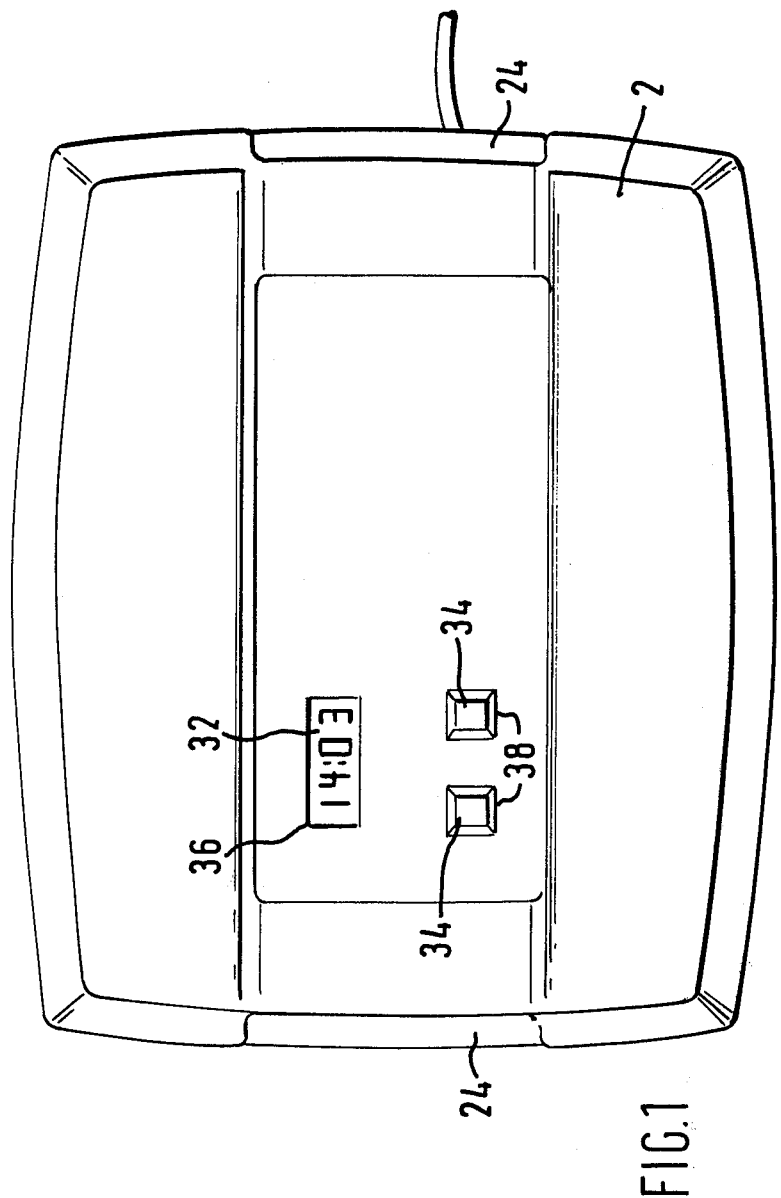
FIG. 1 is a front view of time recording equipment according to the invention.
Figure 2:
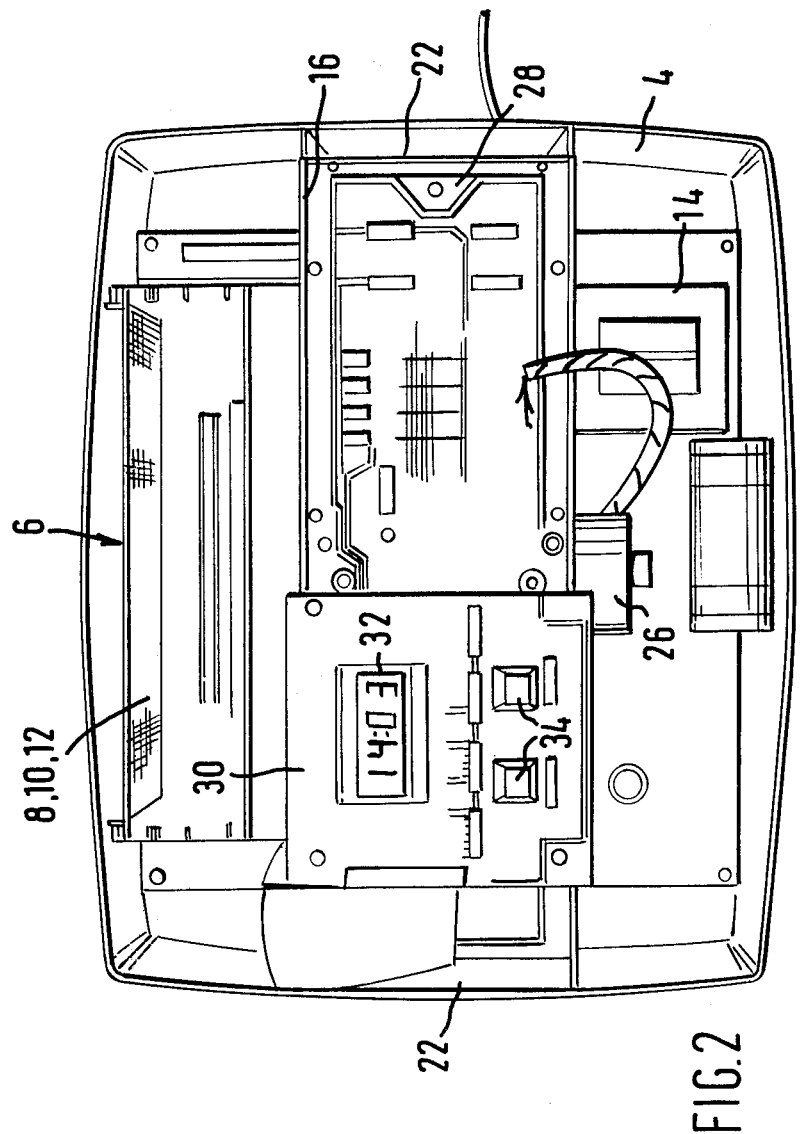
FIG. 2 is a front view similar to FIG. 1 but with the cover removed.

Referring now to the drawings, in FIGS. 1 and 2 time recording equipment comprising a top cover 2 of a casing which fits over a base member 4 of the casing, the base member 4 carrying the components of the time recording equipment. The base member 4, arranged to be attached to a wall by a suitable mounting, contains a stack of printed circuit boards 6. The boards include a board 8 carrying a microprocessor, a board 10 carrying memory storage in RAM and ROM, and an I/O board 12 carrying a clock for indicating the time of day or a clock input interface for time of day signals. The I/O board 12 may also contain a communications interface so that the equipment can be arranged in a distributed data processing system. A further printed circuit board 14 mounted on the base member 4 carries the power supply and a battery back-up for the processing circuitry.

Figure 3:
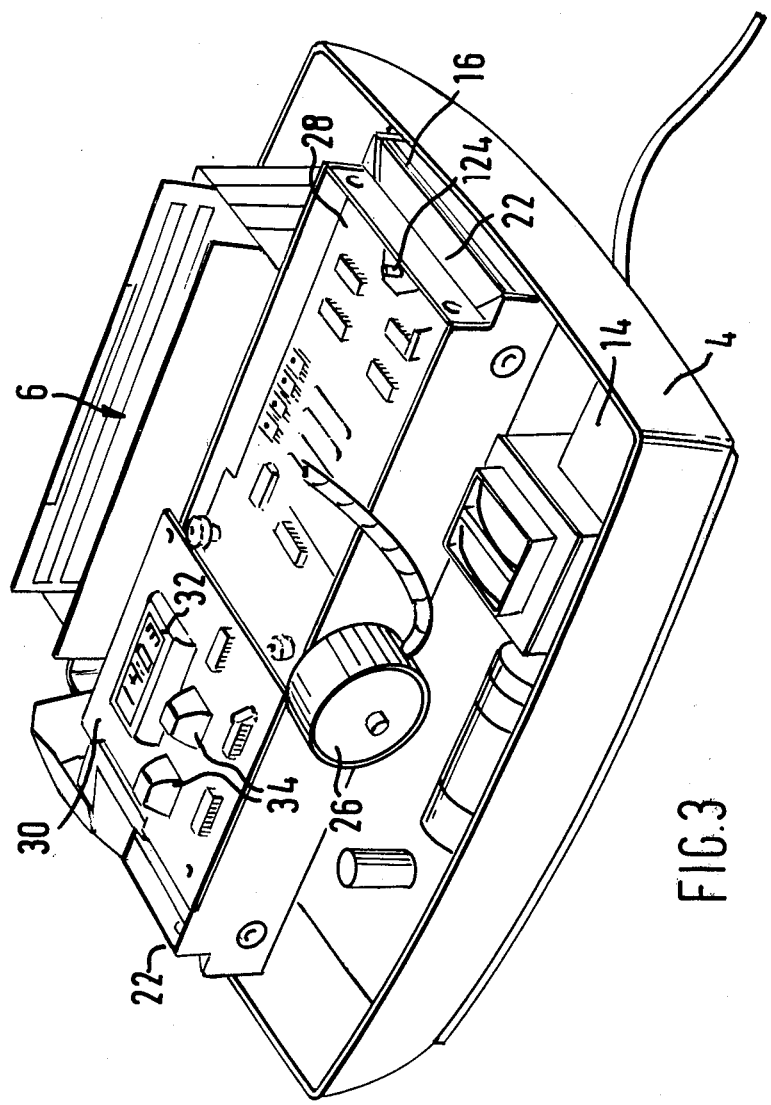
FIG. 3 is a perspective view of the equipment with the cover removed.
Figure 4:
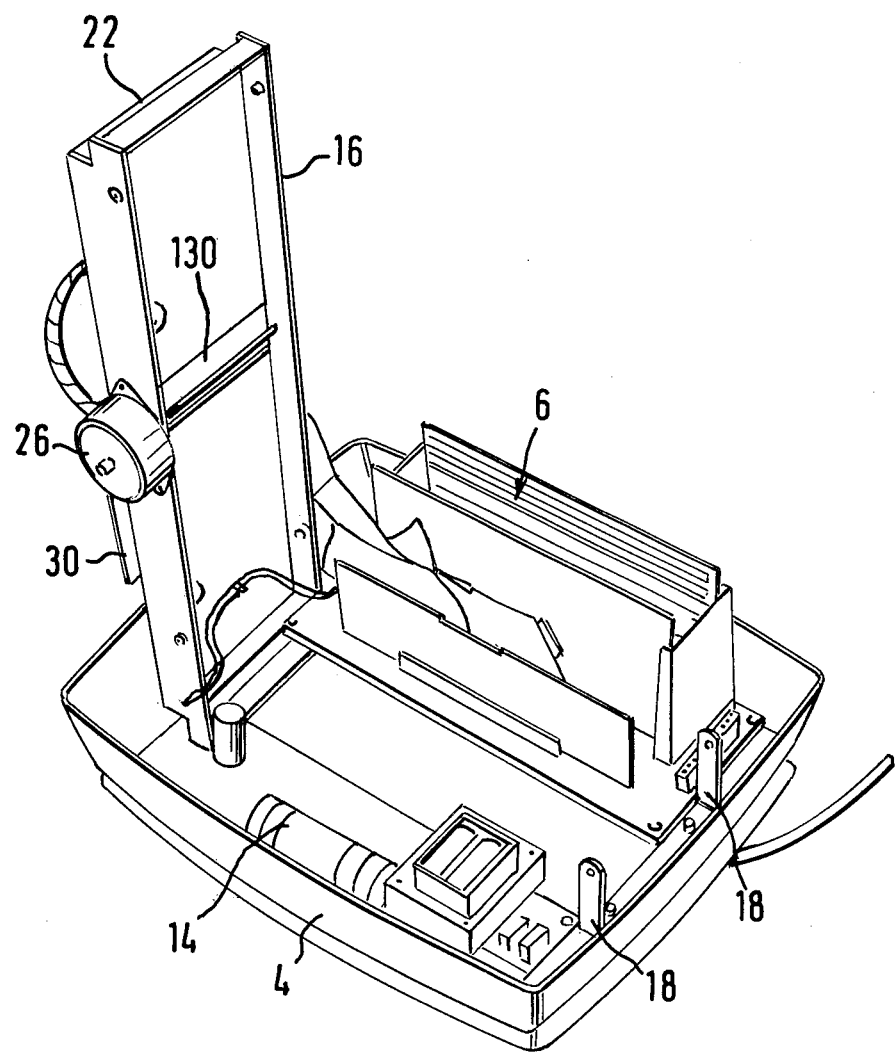
FIG. 4 is a partially exploded perspective view of the equipment.
Figure 5:
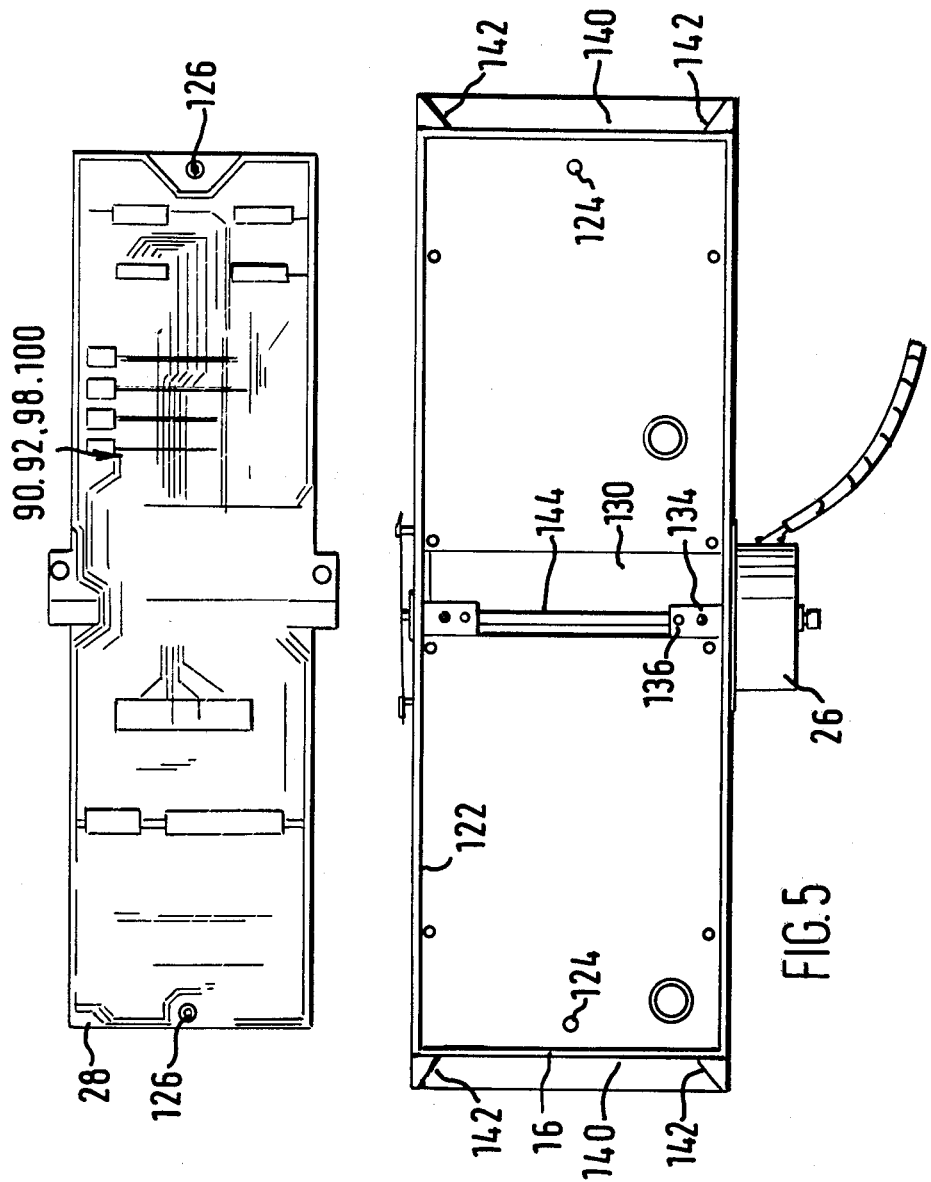
FIG. 5 is a front view of a card guide member and a printed circuit board carrying a printing mechanism and optical character recognition mechanism.
Figure 6:
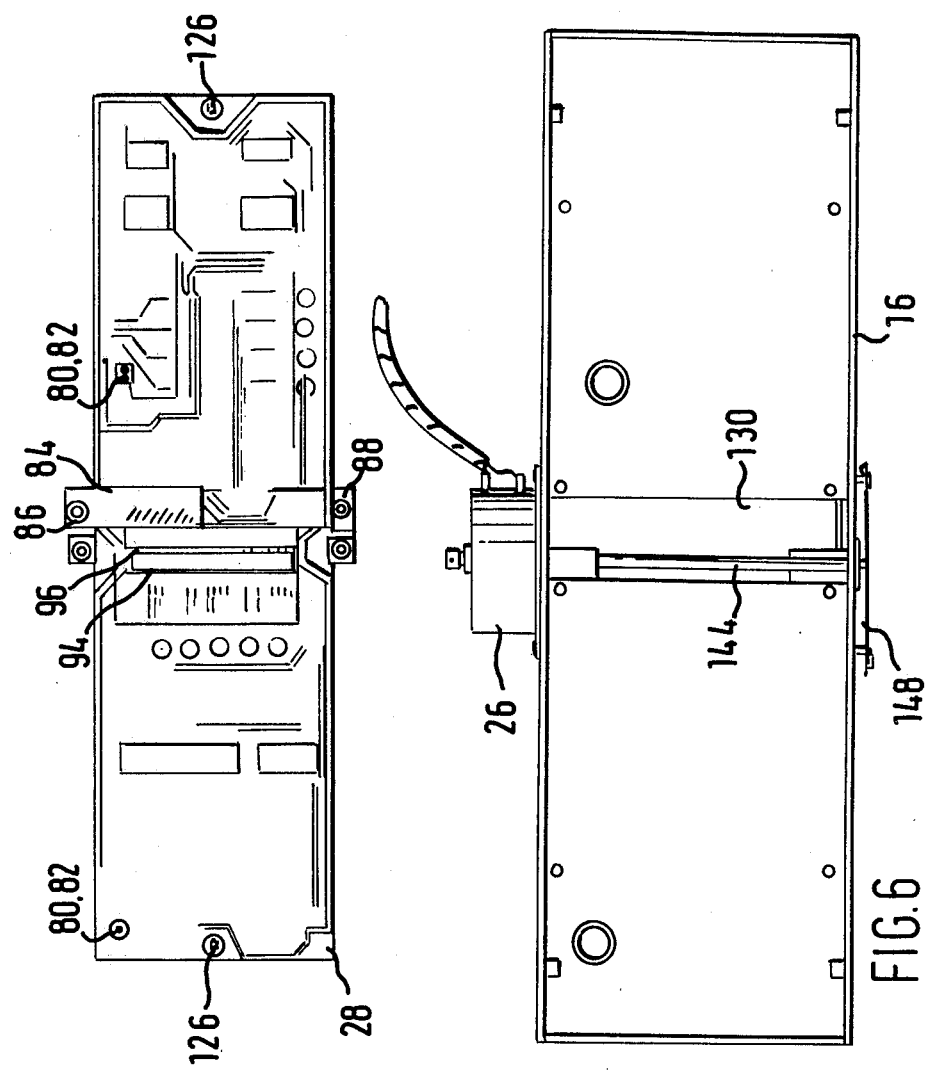
FIG. 6 is a rear view of the card guide member of FIG. 5 and printed circuit board.
Figure 8:
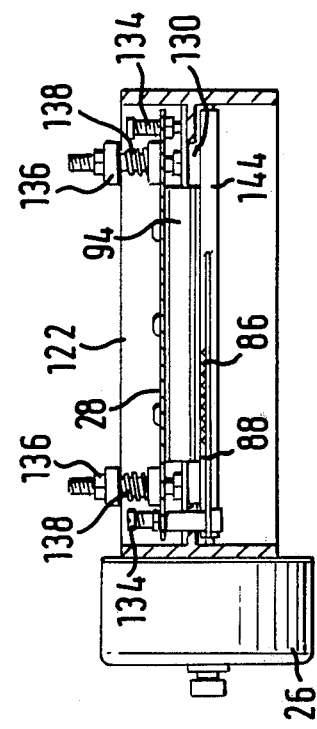
FIG. 8 is a sectional view along the line A—A of FIG. 7.
Figure 7:
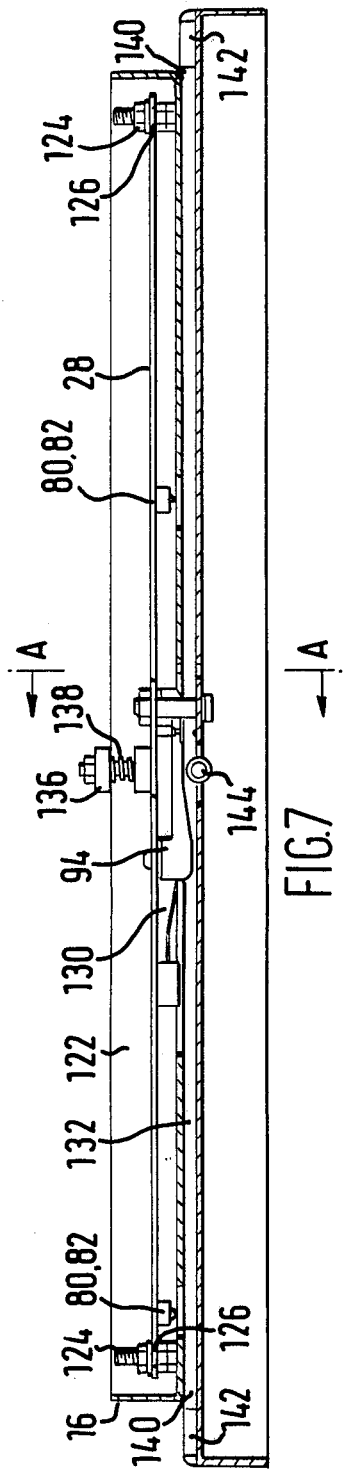
FIG. 7 is a sectional view of the card guide member and associated printed circuit board.

In FIGS. 3 and 4 a card guide member 16 is mounted on upstanding fingers 18 and has input/output slots 22 aligned with slots 24 (FIG. 1) in the top cover 2. The card guide member 16 supports a stepper motor 26, and printed circuit boards 28 and 30. The printed circuit board 30 carries a display 32 and pushbuttons 34 which are aligned with window 36 and apertures 38 in the top cover 2.

In FIGS. 5 to 8, photodetectors 80 and light emitting diodes 82 mounted on the circuit board 28, are arranged to detect by reflection from an incoming or outgoing card the presence or absence of the card. An array of photodetectors 84 mounted on the board 28 cooperate with an array infra-red emitting diodes 86 on a secondary circuit board 88 opposite detectors 84, to detect, by a transmissive technique, marks present on a card. A thermal printer 94, disposed adjacent the light diodes 86, comprises a row of matrix heads 96, each head comprising a row of five heater elements. Drivers 98 and interfacing circuitry 100 are provided for the thermal printer. A further printed circuit board 30 on top of board 28 includes a liquid crystal display 32 which normally shows time of day but may in certain circumstances designate, by means of a code, a fault arising in the time recording equipment. Pushbuttons 34 are provided for over-riding automatic functions of the time recording equipment and for providing functions such as initial setting of the clock.

The printed circuit boards 28, 30 are connected together to form a module which is mounted by nut and bolt connections within a top tray portion of a card guide member 120 as shown in FIGS. 5, 6, 7 and 8. Card guide member 16 comprises an upper tray portion 122 having at each end upstanding bolts 124 which register with apertures 126 in printed circuit board 28 for locating the printed circuit board. Slots 126 are elongate so as to permit precise location of the circuit board within the tray 122. The floor of the tray portion 122 has a central aperture 130 to permit access of printer 58 to a card guide channel 132 immediately below the top portion 122. Printed circuit board 28 is mounted centrally within the tray by means of bolts 134 and bolts 136 having spring coil tensioning 138; this permits a precise vertical positioning of the plane of the printed circuit board. This is important for locating the thermal printing head 94 accurately for optimum printing location within the card guide channel 132.

Card guide channel 132 has input/output slots 140 at each end of the card guide member. Such slots have inwardly tapering side edges 142 to facilitate insertion of the card. A pinch feed rubber roller 144 is provided centrally of the guide channel and beneath the printing head 94. The roller 144 engages the card and a stepper motor 146 mounted on the card guide member drives the roller 144 through a predetermined number of stepping positions as determined by the electrical circuit of the equipment. Mechanical damping means 148 comprising a leaf spring urged against the end of roller 144 is provided on the end of the rubber roller 144 remote from the stepping motor to dampen oscillations of the rubber roller 144 at the end of each stepping motion to reduce imprecision of the location of the card guide member and consequent adverse effects on the quality of printing and character recognition. The roller 144 is arranged to move the card through the guide channel 132 so that a card inserted from one end of the guide channel exits from the other end.

Figure 9:
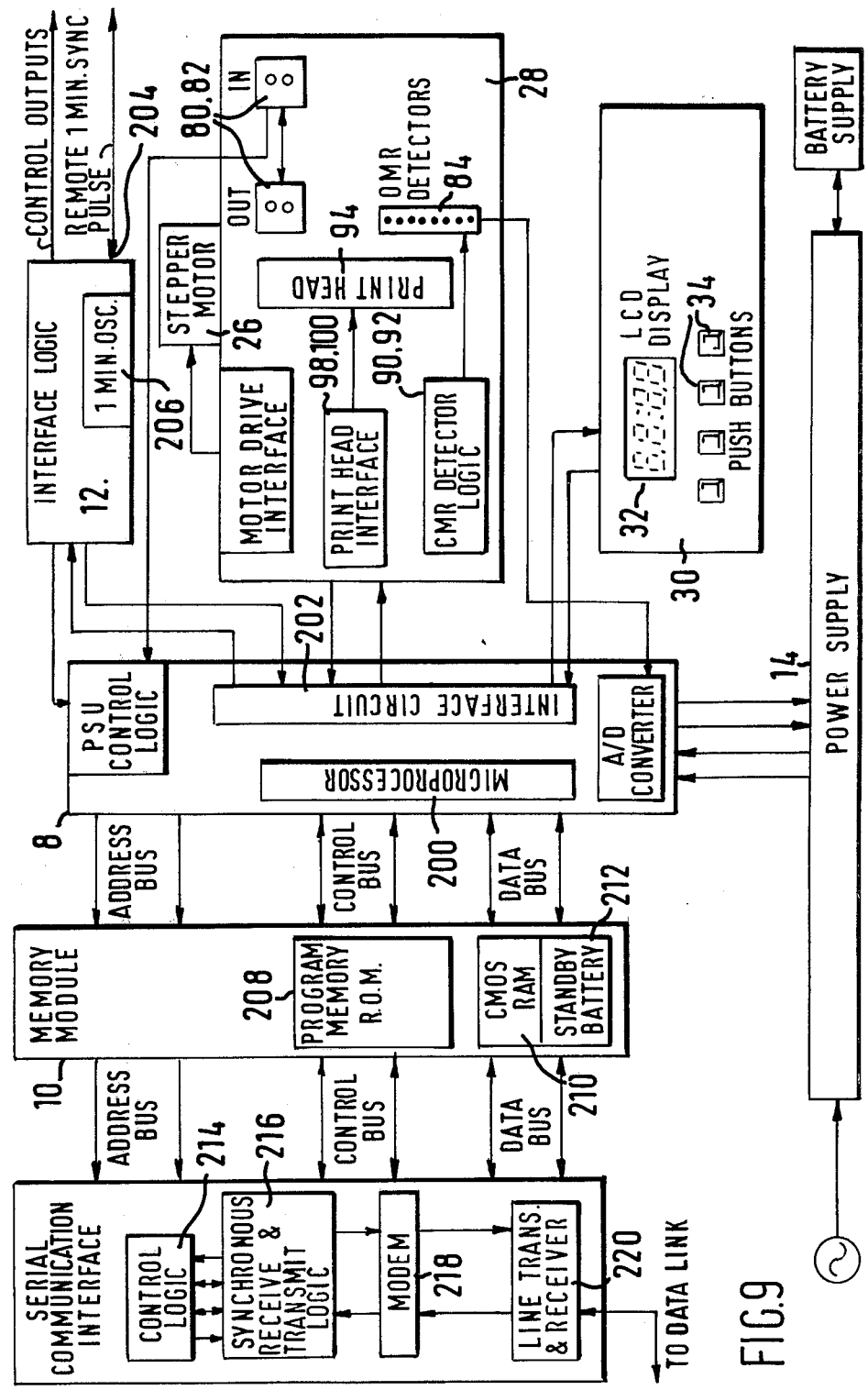
FIG. 9 is a block schematic diagram of an electronic circuit for the equipment.

In FIG. 9, the electrical circuit is arranged on a number of printed circuit boards which have been previously described. The processor board 8 carries an industry standard 8 bit NMOS microprocessor 200. An interface circuit couples the microprocessor system to peripheral devices comprising the printer mechanism 94, the optical mark recognition mechanism 90, 92, an LCD display 32, pushbuttons 34 and interface logic 12. Interface logic 12 includes an input 204 accepting a remote 1 minute sync pulse from a master clock for denoting time of day. Such sync pulse controls a one minute oscillator 206.

A memory module board 10 carries programme memory 208 in ROM together with a read/write memory 210 comprising CMOS RAM having an associated standby battery 212. A serial communication interface links the microprocessor system to a data link and comprises control logic 214, a synchronous receive and transmit logic 216 controlling a modem 218 and a line transmitter and receiver 220. Various control routines for interfacing the microprocessor system with the various peripheral devices are known and therefore will not be described here.

So far as concerns the programme routines for processing data from cards inserted in the equipment, reference should be made to FIGS. 10 to 13 which show various forms of card for use in carrying out various programme routines of the system. Referring to FIG. 10 this shows a card which will normally be used by an employee to record his times of entry and exit from a place of work. The card is formed of thermally sensitive material to cooperate with the thermal printer 94. The bottom edge of the card (which is the leading edge when the card is inserted into the time recording equipment) includes a preprinted black line 250. This is a reference mark for the photo-detecting equipment. Disposed on one edge of the card is a clock track 252 comprising a series of preprinted black bars for strobing by the equipment. Located above line 250 is an array of marks 254 termed a header code. This code may be preprinted, printed by hand, or printed by the printer mechanism 94 of the equipment, (all the heating elements of selected printer heads being operative to generate rectangular black marks).

The marks in rows 256, 258, 260 provide information to identify the type of card inserted into the equipment and whether the card has been inserted correctly. A software sub-routine part of the electronic circuit associated with the optical recognition mechanism 90 is provided for detecting the black marks. Detection is carried out by detecting edge transitions between black and white areas so that any minor variations in black or white intensity do not affect the detection of marks. The last three lines of the header 264, 266, 268 provide an address for a memory block allocated for the particular bearer of the card. The marks also provide the shift number for the user so that data is inserted into a selected shift allocation within the memory block.

Once the header code is recognised the card is moved by the pinch feed mechanism 144 to a position where the thermal printer can print the time of entry of the card onto the card. This position is indicated at 270 and is immediately below an array of figures previously printed on the card. The extreme left-hand column 272 denotes whether the time of insertion of the card is out of limits (as defined by a programme in the equipment, for example, the employee is late), the column 274 indicates a time of arrival, the column 276 denotes a time of leaving and the column 278 indicates a cumulative time at work for the day.

If a card is inserted which does not have a header code 254 the printer is arranged to print a suitable header code and to allocate the card a particular unoccupied memory location which will be used thereafter for that card.

Referring to FIG. 11, a key card has at its extreme right column a header code 280, identifying the type of card. An enable code 282 is provided to set a flag location in a memory of the equipment to a particular value. The effect of inserting this card is to change the mode of operation of the microprocessor in the equipment, the microprocessor being arranged to periodically inspect the flag location and in dependence upon the value of the flag location change to another mode of operation.

Figures 12, 13:
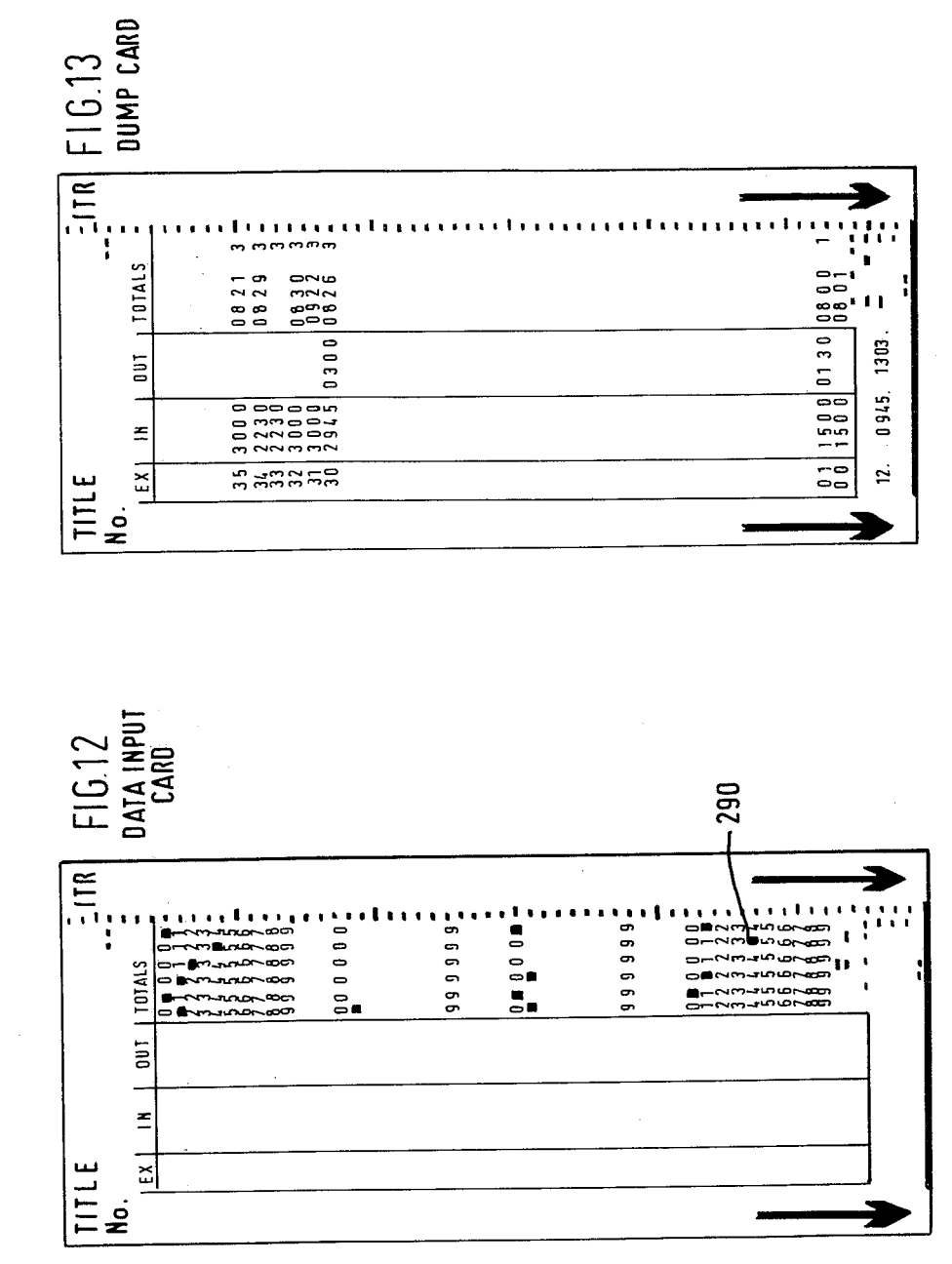

After the insertion of a key card of FIG. 11 another form of card as shown in FIG. 12 is inserted.

An information card is shown in FIG. 12. The information 290, contained on the extreme right-hand column of the card in the form of black marks, is arranged to be read by the optical recognition mechanism 90 to change part of a software programme in the equipment relating to shift periods, overtime rates etc. This is a significant advantage because it means that the equipment can be readily altered by inserting various programme cards to change some of the software routines of the equipment to vary the performance of the equipment. In this way, for example, varying overtime rates, shift periods etc., even within a single factory or site can be monitored and adjusted. Thus, a number of otherwise standard time recording equipments may be supplied to one customer and the customer can add his own fine adjustments and variations by using various programme cards to tailor each individual equipment according to its precise use and location within the factory or site.

A further type of card is shown in FIG. 13. Insertion of this 'dump' card, after insertion of a different type of key card, initiates a programme in the equipment which controls the printer to print out on the dump card all the times of arrival and leaving for a particular employee. Other information can be retrived and printed out on dump cards in accordance with various programmes which can be incorporated in the equipment as desired. For example, routines are provided to assess and process the data in each memory location so as to provide totals etc. for the information of management.

It will be noted that since the processor is of the N-MOS type (Motorola 6802) and uses a relatively large amount of power, the processor is preferably arranged to be normally switched off. When a clock input pulse or a card entry is detected, the processor is switched on and a start sub-routine is followed in order to increment programme counters to appropriate values depending on whether start up is as a result of a clock input or card input, and to permit the various registers to be set to appropriate values. A sub-routine will then be carried out for a card input or to up-date the time of day display. To this end as mentioned earlier, photodetectors 80 and light emitting diodes 82 are provided to enable the insertion of a card to be monitored and the power to be supplied to the processor and other parts of the electronics circuit.

It will be understood that whilst the apparatus above has been disclosed in the context of time recording, the equipment may be used in other applications, for example, issuing or recording railway tickets or tickets for any form of travel. In this case the clock or clock input will be replaced by a suitable data input which may be provided over a communications interface.

In another application, a car park ticket may be provided for an overall period charge. A data recorder according to the invention is then provided and arranged to read the ticket each time it is presented to the recorder and to monitor the total time period for which a user has parked a car. Once a total is reached over a period of several days, use, say, the recorder is arranged to cease to initiate the opening of the car park gate so that the car park user must obtain a new card. Part of the software programmes of the equipment can be readily adjusted by inserting a programme card, when the rate per hour of parking increases say, without having to disassemble the recorder and alter components in the equipment.

A full alpha numeric keyboard may be provided for certain applications where the user wishes to type in information to the time recording equipment.

Although the equipment has been disclosed in the context of cards, badges or other personnel identifying means may be presented to the equipment and the equipment may be suitably modified to recognise such other devices. Further, and especially when used in dumping mode, the equipment can be arranged to operate with a continuous roll of suitable paper and the like.

I claim:

1. A time clock for use with thermographic time cards on which are to be printed legible characters recording the times at which each card is inserted in the machine and a two-dimensional array of optically readable marks identifying individual cards and which for each card accumulates time for successive periods between pairs of insertions of the card into the clock according to semipermanent timekeeping information entered into the machine, comprising in combination:

(a) a housing;
(b) means in said housing defining a card inlet aperture;
(c) a card guide channel within the housing and communicating at one end with the card inlet aperture;
(d) an optical reader located in the card guide channel and arranged to read the array of marks (if any) present on a card conveyed along the card guide channel;
(e) card transport means including a drive roller disposed in said card guide channel in driving engagement with a card to convey said card stepwise along said channel;
(f) a thermal printer located in the card guide channel for printing said legible characters and said two-dimensional array of optically readable marks on cards conveyed along the card guide channel;
(g) means for providing clock signals;
(h) a read-only memory that contains firmware instructions for the operation of the time-clock;
(i) a random-access memory that contains locations in which are stored variable instructions relating to time accumulation and locations in which data relating to the several cards is accumulated; and
(j) a data processor that is electrically connected to the card reader to receive coded signals therefrom, electrically connected to the card transport means to supply actuating signals thereto to cause the card to move stepwise through the machine, electrically connected to the printer to supply actuating signals thereto to print in predetermined locations on the card as it is conveyed past the printer, electrically connected to the clock so that the time of insertion of the card into the machine may be calculated and electrically connected to the read-only memory and the random access memory so that on receipt of a time card for which the optical reader does not detect coded identity marks the firmware in the read-only memory instructs the data processor to signal the printer to print on that card an array of coded identity marks relating to a random access memory location assigned to that card and on reinsertion of a card bearing coded identity marks recognized by the optical reader the firmware in the read-only memory instructs the data processor to cause the random access memory location assigned to that card to be accessed and the printer to print the time of insertion onto the card in legible characters.

2. The time clock of claim 1 wherein the card inlet aperture is located at a first side of said housing, and means in said housing defines a card output aperture in a side opposed to said card inlet aperture and communicating with said guide channel.

3. The time clock of claim 1 wherein the optical reader comprises an array of infra-red emitting diodes directed towards one face of a card passing through said guide channel and an array of photodetectors opposite said diodes and directed towards the other face of the card for detecting infra-red radiation transmitted through said card.

4. The time clock of claim 1 wherein said drive roller is driven by a stepping motor.

5. The time clock of claim 1 wherein said time cards carry a row of longitudinally disposed marks defining a clock track and the optical reader is arranged to detect said marks and supply strobing signals to the data processor.

6. The time clock of claim 1 wherein the thermal printer comprises heating elements disposed in a single row directed transversely of the conveying direction of the card, said marks and legible characters being built up in rows printed successively as said card is conveyed stepwise past said printer.

7. A time clock having a housing, means in said housing defining a card inlet aperture, a card guide channel within the housing and communicating at one end with the card inlet aperture, card transport means including a drive roller located in said card guide channel to convey cards stepwise along said channel, an optical reader located in the card guide channel and a printer that can print legible characters and optically readable marks on cards conveyed along said channel in combination with cards for insertion in said aperture having timing marks disposed in a row directed along the conveying direction through said channel adjacent one edge of the card, said cards being of different classes including:

information cards having a strip for optically readable marks adjoining the row of timing marks for substantially the whole length of the card but extending over only a part of the width thereof, the remainder of the width having one or more fields for legible characters;

means in said housing that on receipt of a time card for which the optical reader does not detect coded identity marks the firmware in a read-only memory instructs a data processor to signal the printer to print on that card an array of coded identity marks relating to a random access memory location assigned to that card so that on reinsertion of a card bearing coded identity marks recognized by the optical reader the firmware in the read-only memory instructs the data processor to cause the random access memory location assigned to that card to be accessed and the printer to print the time of insertion onto the card in legible characters; and time record cards having a strip adjoining the row of timing marks and extending over only a part of the width thereof divided into a field constituting a minor portion of the card length for optically readable marks and a field constituting a major portion of the card length for legible characters, the remainder of the width having one or more fields for legible characters.

8. The combination of claim 7 wherein the printer extends over substantially the whole width of a card conveyed along said channel and is operable to print both legible characters and in cooperation with said card transport means to print a two-dimensional array of optically readable marks in said strip adjoining said row of timing marks.

9. The combination of claim 8, wherein the printer is a thermal printer having heater elements disposed in a single row.

10. The combination of claim 7 additionally comprising key cards bearing in a strip adjoining said timing marks an array of optically readable characters that on recognition by logic means in said clock enables change in its mode of operation on insertion of subsequent cards.

11. The combination of claim 10 additionally comprising dump cards that bear in a strip adjoining said timing member within a field occupying a minor portion of the card an array of optically readable characters that on recognition by logic means in said clock causes said printer to print out stored timekeeping information in legible characters, the balance of said strip being available for alphanumeric characters.

12. The combination of claim 10 wherein each information card has some optically readable marks that classify said card as an information card and other marks that provide an optically readable input of the information.

13. The combination of claim 10 wherein each time card carries some optically readable marks that classify said card as a time card and eventually other optically readable marks that denote its individual identity.

* * * * *